(12) United States Patent
Mikhailov et al.

(10) Patent No.: US 11,436,003 B2
(45) Date of Patent: Sep. 6, 2022

(54) NON-STOP INTERNET-OF-THINGS (IOT) CONTROLLERS

(71) Applicant: Flowfinity Wireless, Inc., Vancouver (CA)

(72) Inventors: Dmitry Mikhailov, Surrey (CA); Vadym Stetsiak, Surrey (CA)

(73) Assignee: Flowfinity Wireless, Inc., Vancouver (CA)

( * ) Notice: Subject to any disclaimer, the term of this patent is extended or adjusted under 35 U.S.C. 154(b) by 343 days.

(21) Appl. No.: 16/829,561

(22) Filed: Mar. 25, 2020

(65) Prior Publication Data

US 2020/0310786 A1 Oct. 1, 2020

Related U.S. Application Data

(60) Provisional application No. 62/824,256, filed on Mar. 26, 2019.

(51) Int. Cl.
| | | |
|---|---|---|
| *G06F 9/44* | (2018.01) | |
| *G06F 8/656* | (2018.01) | |
| *H04L 69/16* | (2022.01) | |
| *G16Y 40/50* | (2020.01) | |
| *G16Y 40/40* | (2020.01) | |
| *G16Y 10/75* | (2020.01) | |

(52) U.S. Cl.
CPC .............. *G06F 8/656* (2018.02); *H04L 69/16* (2013.01); *G16Y 10/75* (2020.01); *G16Y 40/40* (2020.01); *G16Y 40/50* (2020.01)

(58) Field of Classification Search
CPC ........... G06F 8/656; G06F 8/65; H04L 69/16; G16Y 40/50; G16Y 40/40; G16Y 10/75

USPC ......................................................... 717/172
See application file for complete search history.

(56) References Cited

U.S. PATENT DOCUMENTS

| | | | | |
|---|---|---|---|---|
| 5,475,818 A | * | 12/1995 | Molyneaux | G06F 15/17 709/208 |
| 8,325,059 B2 | * | 12/2012 | Rozenboim | H04L 27/10 340/870.07 |
| 9,584,137 B2 | * | 2/2017 | Hann | H03L 7/07 |
| 10,275,176 B1 | * | 4/2019 | Gold | G06N 20/00 |

(Continued)

OTHER PUBLICATIONS

Title: A system architecture for software-defined industrial Internet of Things, auhor: P Hu published on 2015.*

(Continued)

*Primary Examiner* — Chameli Das
(74) *Attorney, Agent, or Firm* — Mehrman Law Office; Michael J. Mehrman (57) ABSTRACT

Internet-of-Things ("IoT") controllers built using hardened industrial technologies which improve functionality and reliability, such as a fixed-loop model in which a loop is repeated with configured time periodicity where sensors are queried, sensor responses are read, configured calculations are performed, and logic rules are evaluated resulting in decisions made and outputs activated. A variety of redundancy techniques are utilized to provide continuous non-stop operation of IoT controllers to compensate for possible hardware and software failures. Robust IoT controller redundancy also allows periodic maintenance, software updates and security patch installation without shutting down the IoT controllers.

18 Claims, 8 Drawing Sheets

(56) References Cited

U.S. PATENT DOCUMENTS

| | | | | |
|---|---|---|---|---|
| 2004/0117562 A1* | 6/2004 | Wu | ............... | G06F 11/2076 |
| | | | | 709/213 |
| 2009/0099824 A1* | 4/2009 | Falash | ............... | H04L 67/131 |
| | | | | 703/8 |
| 2014/0089717 A1* | 3/2014 | Alsup | ............... | G05B 19/05 |
| | | | | 713/401 |
| 2015/0149503 A1* | 5/2015 | Wollrath | ............... | G06F 9/5011 |
| | | | | 707/770 |
| 2015/0195102 A1* | 7/2015 | Mochida | ............... | H04L 12/437 |
| | | | | 370/223 |
| 2017/0230333 A1* | 8/2017 | Glazemakers | ............... | H04L 63/029 |
| 2018/0343183 A1* | 11/2018 | Pope | ............... | G06F 13/1689 |

OTHER PUBLICATIONS

Title: Supporting smart-city mobility with cognitive Internet of Things, author: A Somove et al, published on 2013.*
Title: Fault Tolerant Mechanisms for SDN Controllers, author: Liran Sidki et al, published on 2016.*
Title: Inter-controller traffic t support consistency in ONOS clusters, author: AS Muqaddas, published on 2017.*

* cited by examiner

NON-STOP INTERNET-OF-THINGS (IOT) CONTROLLERS

REFERENCE TO RELATED APPLICATION

This application claims priority to U.S. Provisional Application Ser. No. 62/824,256 titled "Non-stop Operation For Internet-of-Things (IoT) Controllers" filed Mar. 26, 2019, which is incorporated by reference.

TECHNICAL FIELD

The present invention related to the Internet-of-Things ("IoT") and, more particularly, to redundancy techniques allowing non-stop operation of IoT controllers.

BACKGROUND

Internet-of-Things ("IoT") controllers are installed in the vicinity of physical sensors and typically connected using wired interfaces or wireless protocols to sensors and output devices, such as relays, actuation motors, etc. IoT Controllers may be connected to sensors and output devices either directly using analog or digital signals, interfaces such as for example 4-20 ma, or using communication bus such as 1-wire, I2C or CAN for example, or using a wired or wireless network using datagram, TCP/IP or other suitable protocols. Wireless connectivity of sensors and output devices is also possible using local wireless connectivity technologies, such as Bluetooth. Sensors and outputs can be physical devices or software services. Controllers perform both on-board logic as well as serve as an interface to centralized configuration, monitoring and control systems, which may be located in the cloud or another computing environment. Sensors and output devices are typically not designed to be connected directly to global networks, while controllers provide this network capability while also adding features critical for securing information flow. There is a continuing need to provide IoT controllers with improved functionality and reliability.

SUMMARY

The present invention meets this need through Internet-of-Things ("IoT") controllers built using hardened industrial technologies which improve functionality and reliability, such as a fixed-loop model in which a loop is repeated with configured time periodicity where sensors are queried, sensor responses are read, configured calculations are performed, and logic rules are evaluated resulting in decisions made and outputs activated. A variety of redundancy techniques are utilized to provide continuous non-stop operation of IoT controllers to compensate for possible hardware and software failures. Robust IoT controller redundancy also allows periodic maintenance, software updates and security patch installation without shutting down the IoT controllers.

It will be understood that additional techniques and structures for implementing particular embodiments of the invention and accomplishing the associated advantages will become apparent from the following detailed description of the embodiments and the appended drawings and claims.

DETAILED DESCRIPTION

The invention may be embodied in an Internet-of-Things ("IoT") controller built using hardened industrial technologies which improve functionality and reliability, such as a fixed-loop model in which a loop is repeated with configured time periodicity where sensors are queried, sensor responses are read, configured calculations are performed, and logic rules are evaluated resulting in decisions made and outputs activated.

As an example operating environment, consider a chicken house that needs to be vented when ammonia levels exceed certain threshold value. Multiple ammonia sensors are placed throughout chicken house that are connected to IoT controller with wiring or wirelessly. A ventilation motor is connected to the IoT controller via a relay. The IoT controller periodically samples the sensors and forwards the readings to a centrally located operations server equipped with a database which stores a history of these readings. The operations server can be located at a remote facility or it can be a cloud-based service. When ammonia sensor readings exceed given threshold, the operations server signals a local IoT controller to close the relay. This turns on ventilation and brings in fresh air to the chickens venting out accumulated ammonia in the process. After the sensor readings are brought back to normal levels, the operations server allows some additional run time for the ventilation motor and then signals the IoT controller to open the relay which disconnects power from the ventilation motor. Alternatively this relay control logic can be embedded into an IoT controller itself, which turns the IoT controller into an autonomous closed loop control system that can control the chicken environment even if connectivity with the remote control server is interrupted. In this case, the IoT controller still maintains connectivity with the centralized server to deliver sensor readings and relay status information for alerting and historical archiving purposes.

Figure 1:
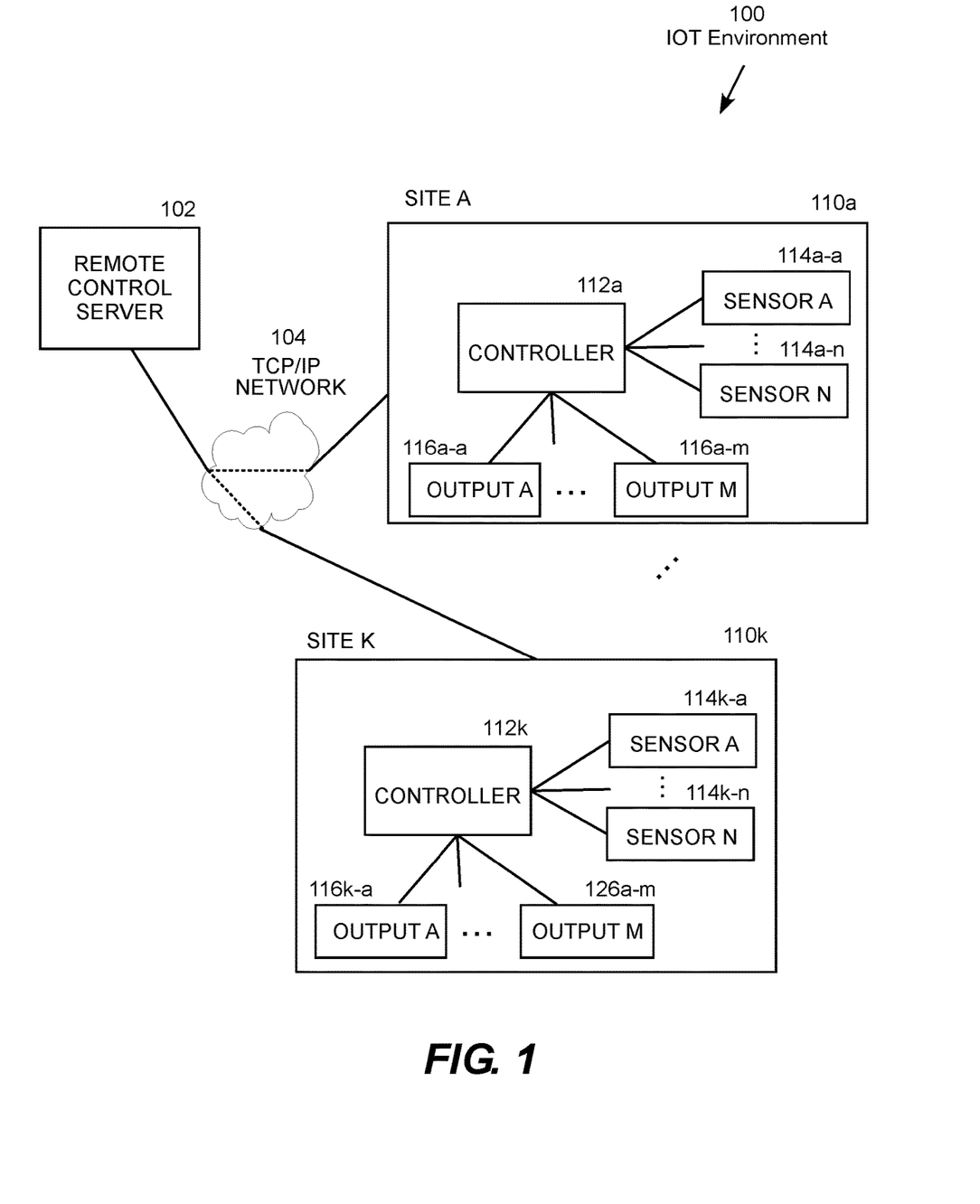
FIG. 1 is a conceptual block diagram of an Internet-of-Things ("IoT") controller deployment environment.

FIG. 1 is a conceptual block diagram 100 illustrating a typical operating environment for a non-stop IoT controller. A centralized control server 102 which, for example, can be deployed as a cloud service, gathers data from multiple sites 110a through 110k. Each site has a local IoT controller that is interfaced via local connections to sensors and/or output devices. In this particular example, the site 110a has a local IoT controller 112a that is interfaced via local connections to sensors 114a-a through 114a-n and/or output devices 116a-a through 116a-m. These sensors and output devices are not designed to operate on global TCP/IP networks. The IoT controller 110a therefore bridges the local connectivity for the sensors 114a-a through 114a-n and output devices 116a-a through 116a-n to a remote control server using a TCP/IP network 104, such as the Internet. Similarly, the site 110k has a local IoT controller 112k that is interfaced via local connections to sensors 114k-a through 114k-n and/or output devices 116k-a through 116k-m. Again, the IoT controller 110k bridges the local connectivity for the sensors 114k-a through 114k-n and output devices 116k-a through 116k-n to the centralized remote control server 102 using the TCP/IP network 104, such as the Internet. The remote control server 102 may provide a variety of services using uplink IoT data, such as data collection for the IoT devices (sensors and output devices in this example), aggregation and analysis of that data, artificial intelligence analysis, reporting, and so forth. The remote control server 102 may also provide a variety of downlink services through the local controllers 112a-k, such as calibrating, controlling, resetting, and upgrading the IoT devices.

Depending on the environment monitored by the IoT controllers 110a through 110k and their connected sensors and output devices, the function of IoT controller may be considered mission critical. In this case, the downtime of the IoT controllers 110a through 110k needs to be minimized both for planned and unplanned events. The IoT controllers 110a through 110k are therefore built using hardened industrial technologies to improve reliability and aid in reducing planned and unplanned downtime. In order to provide continuous non-stop operation of the IoT controllers 110a through 110k, additional measures are provided to compensate for both possible hardware and software failures, as well as the need to perform periodic maintenance, software updates and security patch installation. The IoT architecture and operational processes minimize both planned and unplanned downtime beyond what is possible with traditional hardened industrial controller technologies.

For example, an embodiment of the IoT controller may be based on a fixed loop model in which a loop is repeated with configured time periodicity in which sensors are queried, sensor responses are read, configured calculations are performed, logic rules are evaluated resulting in decisions made and outputs activated. It will be understood that different IoT controller logic can be implemented while following the same redundancy principles disclosed for this invention.

More specifically a representative embodiment may be based on a model in which multiple services can be configured, each service having multiple states. Multiple sensor inputs (measurements) are defined, along with declarative computed parameters that perform calculations over sensor readings. Within each loop cycle sensor values are read, parameters are calculated, and configured declarative logic rules are used to compute a state for each service. Each state may have action elements attached that are executed upon entering the state. For example, these actions may include notifications or alerts, variable assignment (said variables persist over multiple loop cycles and can be referenced in measure calculations and logic rules), or output activation such as opening or closing relays.

Figure 2:
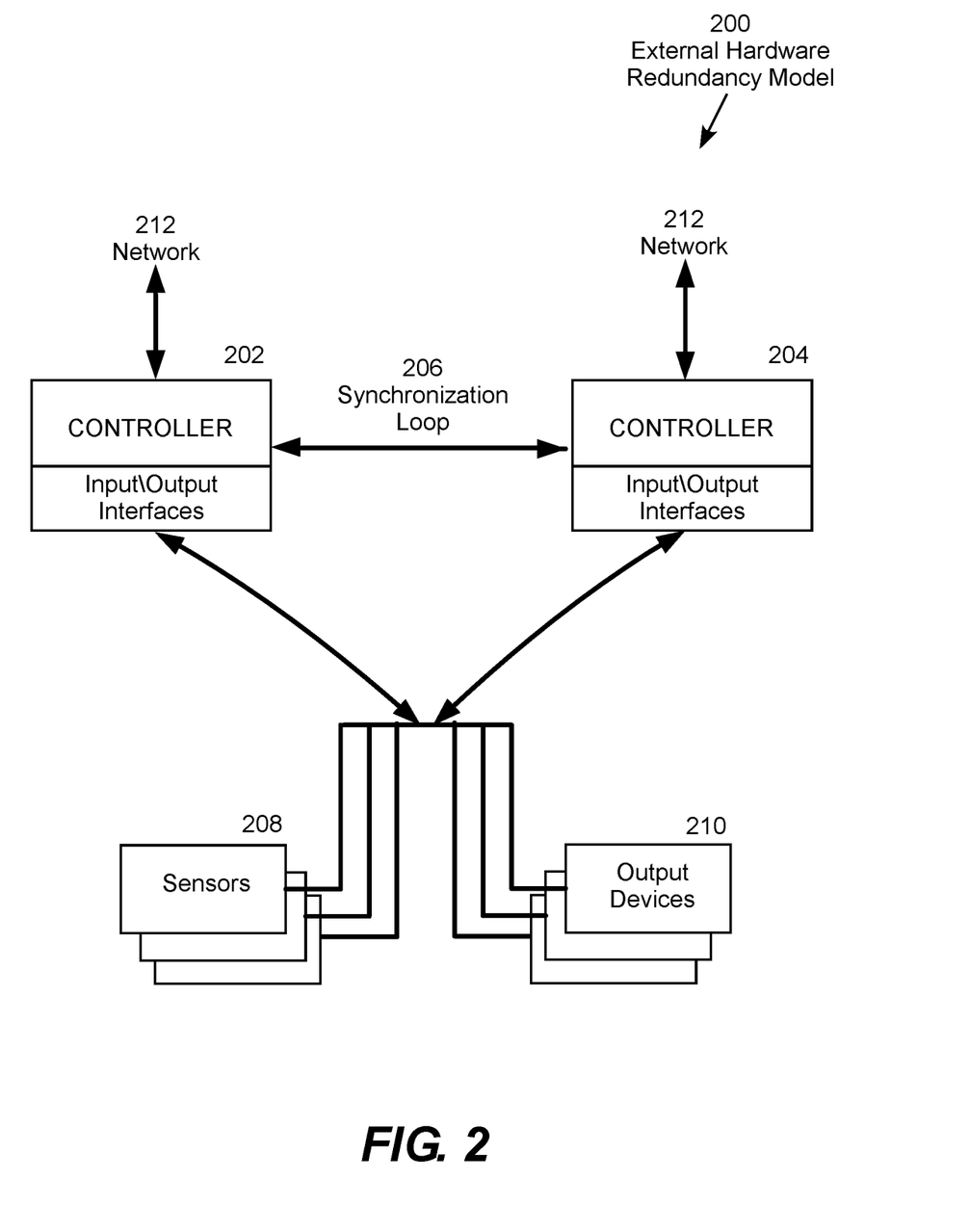
FIG. 2 is a conceptual block diagram of an external hardware redundancy model.

FIG. 2 is a conceptual block diagram of an external hardware redundancy model 200. A redundant controller architecture includes controllers 202 and 204 operating in a synchronization loop 206 to provide sensors 208 and output devices 210 with communication connectivity to a TCP/IP network 212, such as the Internet. In this embodiment, the redundant controllers 202 and 204 are physically distinct devices.

Figure 3:
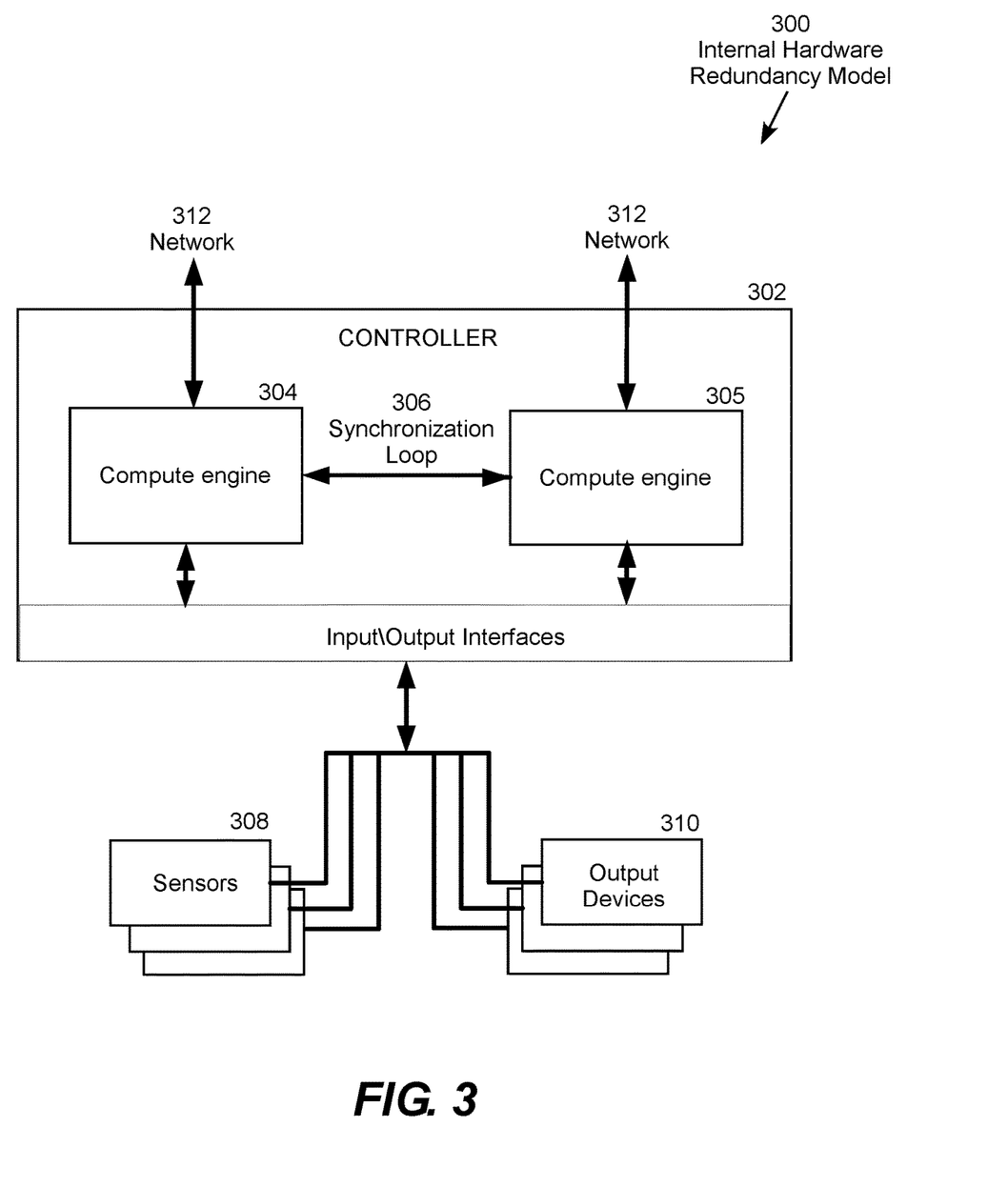
FIG. 3 is a conceptual block diagram of an internal hardware redundancy model.

FIG. 3 is a conceptual block diagram of an internal hardware redundancy model 300. This redundant controller architecture includes a single controller 302 that includes redundant compute engines 304 and 305 operating in a synchronization loop 306 to provide sensors 308 and output devices 310 with communication connectivity to a TCP/IP network 312, such as the Internet. In this embodiment, the redundant compute engines 304 and 305 are physically distinct processors within the controller 302.

Figure 4:
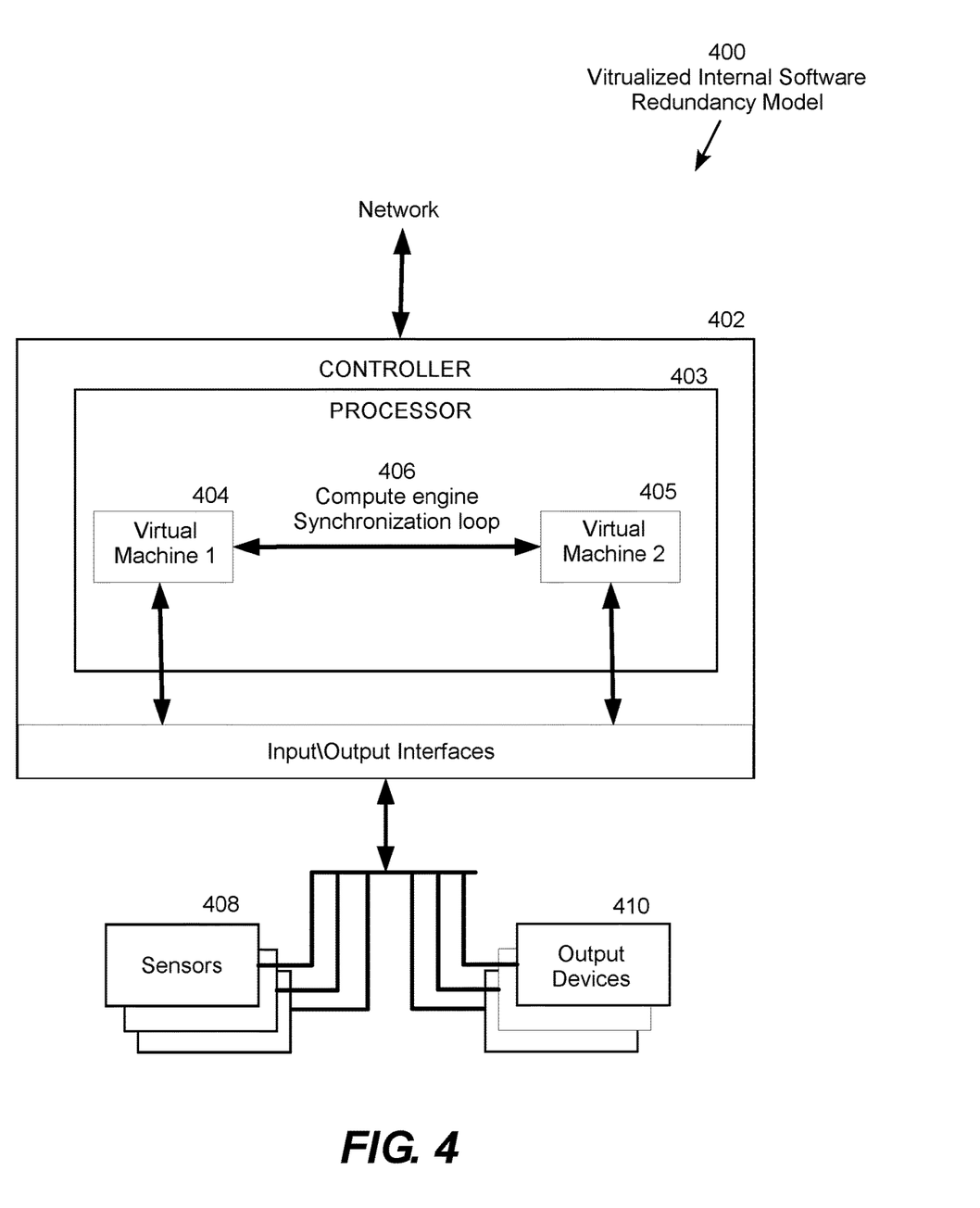
FIG. 4 is a conceptual block diagram of a virtualized internal software redundancy model.

FIG. 4 is a conceptual block diagram of a virtualized internal software redundancy model 400. This redundant controller architecture includes a single controller 402 that includes single processor (compute engine) 403 running redundant virtual machines 404 and 405 operating in a synchronization loop 406 to provide sensors 408 and output devices 410 with communication connectivity to a TCP/IP network 412, such as the Internet. In this embodiment, the redundant virtual machines 404 and 405 are separate software instances running on the same processor 403 within the controller 402.

Figure 5:
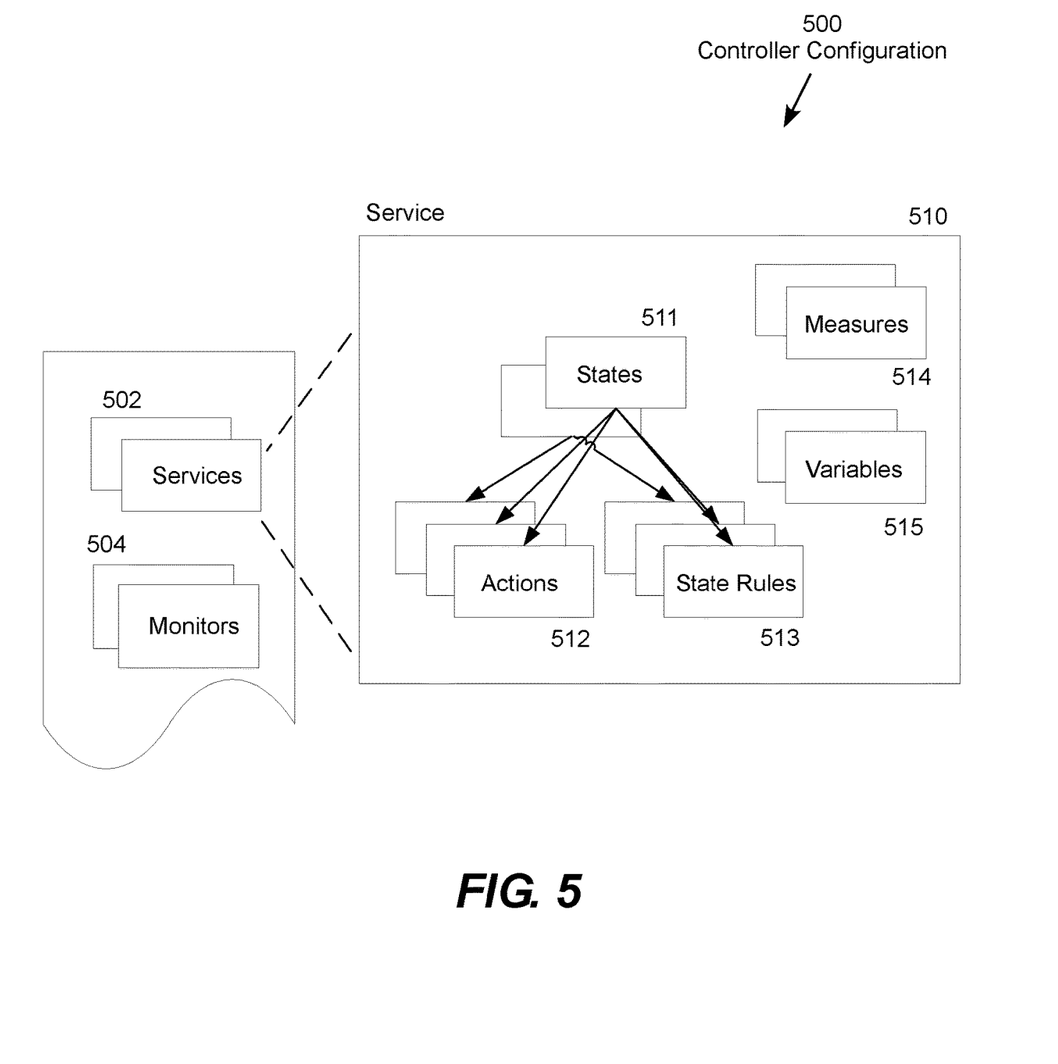
FIG. 5 is a conceptual block diagram of a controller configuration.

FIG. 5 is a conceptual block diagram of controller configuration 500 implemented for the preferred embodiment. Controller configuration 500 has multiple monitors 502 and multiple services 504. Services have one or more states defined. Each state has a declarative rule based on which that state is selected by the controller loop. States may have variable assignments and output actions configured. For example, a representative service 510 operates in a number of states 511 that implement a number of actions 512 based on state rules 513, which typically utilize one or more measurements 514 and variables 515. As an illustrative example, the service 510 may utilize measures defined as declarative formulas based on monitor values, variables and other measures.

Figure 6:
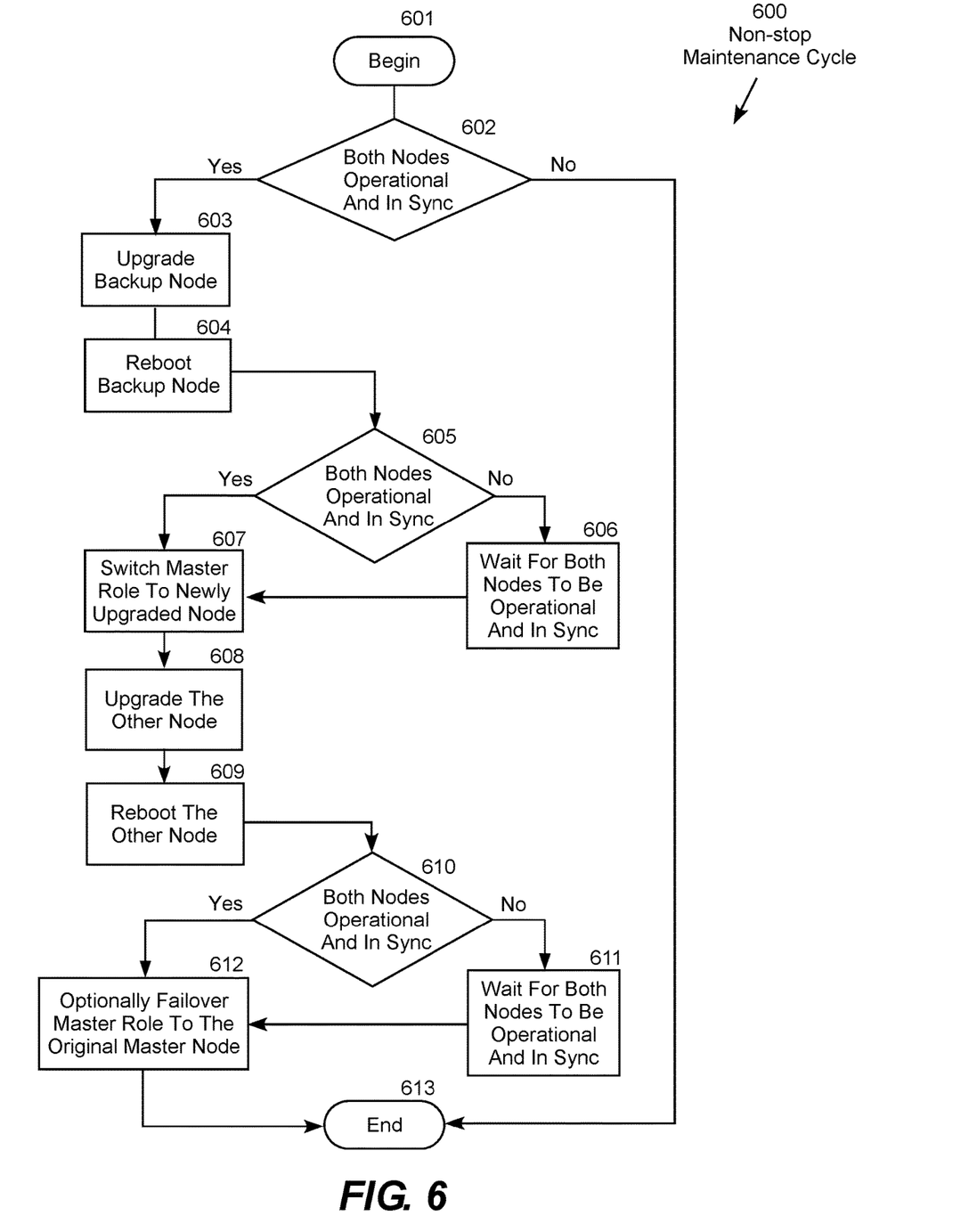
FIG. 6 is a logic flow diagram for a non-stop maintenance cycle.

FIG. 6 is a logic flow diagram 600 for a non-stop maintenance cycle performed by a redundant controller, such as controllers 202 and 204 shown in FIG. 2, the controller 302 shown in FIG. 3, or the processor 403 running on the controller 402 shown in FIG. 4. The procedures begins in step 601, which is followed by step 602, in which the redundant controller determines whether both nodes (e.g., the controllers 202 and 204 shown in FIG. 2, the compute engines (processors) 304 and 305 shown in FIG. 3, or the virtual machines 404 and 405 shown in FIG. 4) are both operational and in sync. If both nodes are not operational an in sync, the "No" branch is followed from step 602 to the end step 613.

If both nodes are operational an in sync, the "Yes" branch is followed from step 602 to step 603, in which the redundant controller upgrades the first nodes operating in a backup mode (backup node) while the second note (master node) continues to provide TCP/IP connectivity to its associated IoT sensors and controllers. Step 603 is followed by step 604, in which the redundant controller reboots the first node (backup node). Step 604 is followed by step 605, in which the redundant controller, in which the redundant controller again determines whether both nodes are both operational and in sync. If both nodes are not operational an in sync, the "No" branch is followed from step 605 to step 606, in which the redundant controller waits for both nodes to be operational an in sync.

If both nodes are operational an in sync, the "Yes" branch is followed from step 605 to step 607, in which the redundant controller switches the master role to the newly upgraded node (i.e., switches the first node to master role, and switches the second node to backup role). Step 606 is also followed by step 607. Step 607 is followed by step 608, in which the redundant controller upgrades the second node (now the backup node) while the first node (now the master node) continues to provide TCP/IP connectivity to its associated IoT sensors and controllers. Step 608 is followed by step 609, in which the redundant controller reboots the second node (now the backup node).

Step 609 is followed by step 610, in which the redundant controller, in which the redundant controller again determines whether both nodes are both operational and in sync. If both nodes are not operational an in sync, the "No" branch is followed from step 610 to step 611, in which the redundant controller waits for both nodes to be operational an in sync. If both nodes are operational an in sync, the "Yes" branch is followed from step 610 to step 612, in which the redundant controller again switches the master role to the newly upgraded node (i.e., switches the second node to master role, and switches the first node to backup role). Step 611 is also followed by step 612. Step 612 is followed by the end step 613.

Figure 7:
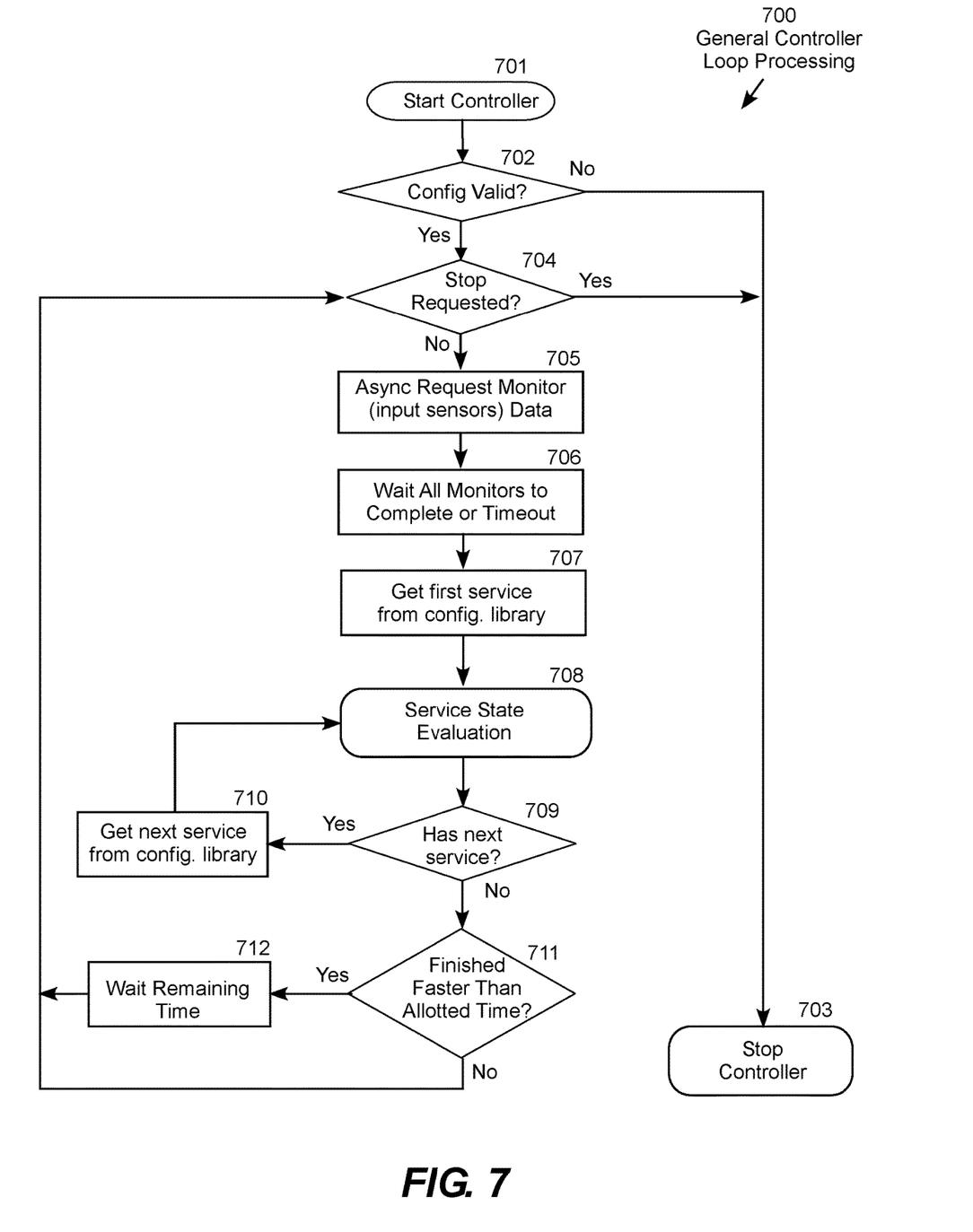
FIG. 7 is a logic flow diagram for general controller loop processing.

FIG. 7 is a logic flow diagram 700 for general controller loop processing. The procedure begins in step 701, which is followed by step 702, in which the redundant controller determined whether the configuration of both nodes is valid. If the configuration of both nodes is not valid, the "No" branch is followed from step 702 to step 703, in which the redundant controller stops. If the configuration of both nodes is valid, the "Yes" branch is followed from step 702 to step 704, in which the redundant controller stops, in which the redundant controller determines whether a "stop" has peen requested. If a "stop" has been requested, the "Yes" branch is followed from step 704 to step 703, in which the redundant controller stops. If a "stop" has not been requested, the "No" branch is followed from step 704 to step 705, in which the redundant controller requests data from its associated data sensors. Step 705 is followed by step 706, in which the redundant controller waits for all monitors (sensors) to complete or timeout. Step 706 is followed by step 707, in which the redundant controller gets a first service from the configuration library. Step 707 is followed by step 708, in which the redundant controller performs a service evaluation and associated procedures (see FIG. 8) using the service retrieved from the configuration library.

Figure 8:
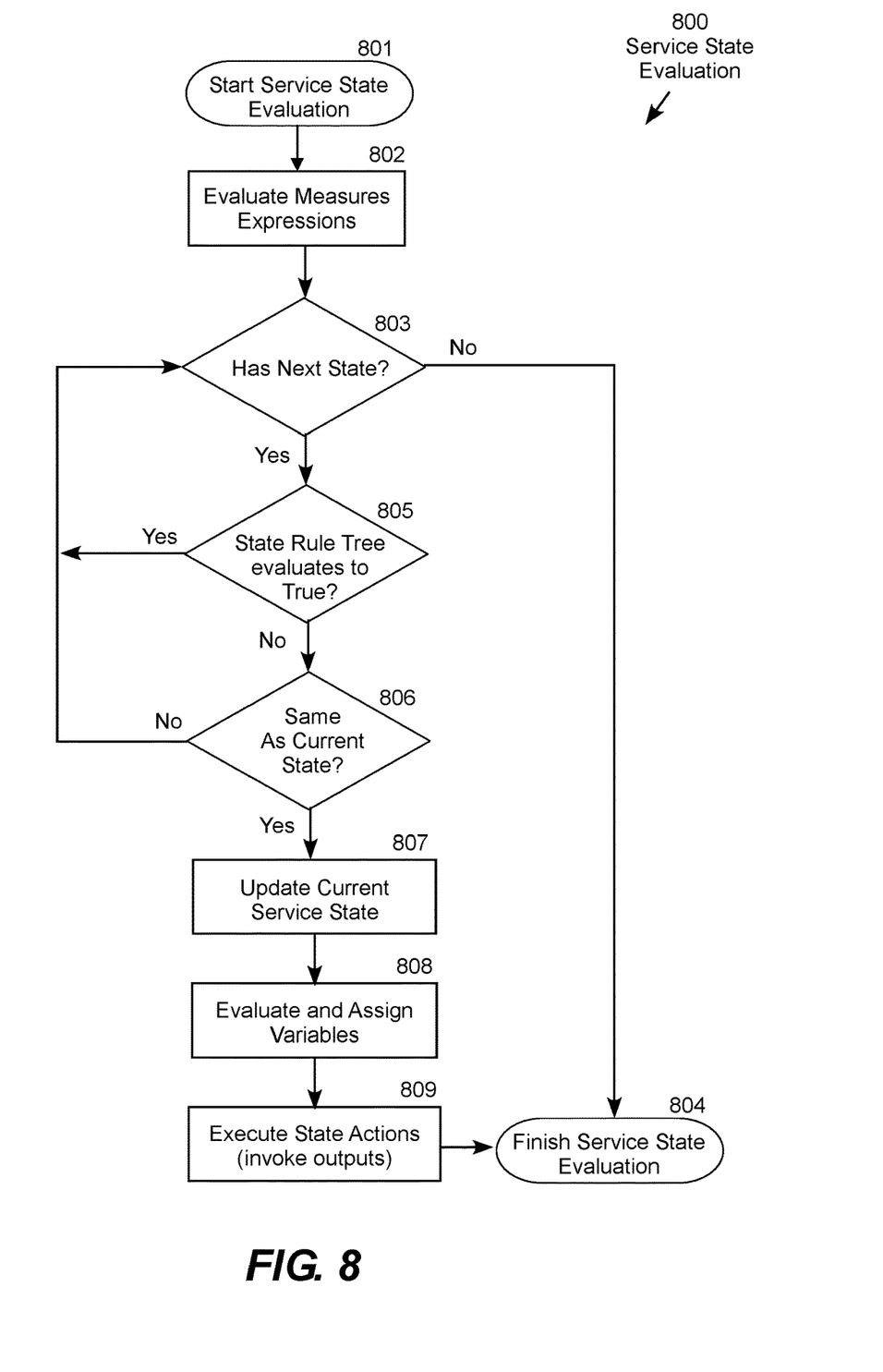
FIG. 8 is a logic flow diagram for service state evaluation.

Step 708 is followed by step 709, in which the redundant controller determines whether the configuration library has another serviced to perform. If the configuration library has another serviced to perform, the "Yes" branch is followed from step 709 to step 710, in which the redundant controller gets the next service from the configuration library. Step 710 loops back to step 708, in which the redundant controller performs a service evaluation and any associated procedures using the service retrieved from the configuration library. If the configuration library does not have another serviced to perform, the "No" branch is followed from step 710 to step 711, in which the redundant controller determines whether the service evaluation and any associated procedure finished faster than an allotted time. If the service evaluation and any associated procedure finished faster than the allotted time, the "Yes" branch is followed from step 711 to step 712, in which the redundant controller waits for the allotted time to expire. If the allotted time has already expired, the "No" branch loops back from step 712 to step 704, in which the redundant controller again determines whether a "stop" has been requested. Step "No" branch from step 711 also loops back to step 704, FIG. 8 is a logic flow diagram 800 for service state evaluation. In step 801, the redundant controller starts a service state evaluation. Step 801 is followed by step 802, in which the redundant controller evaluates measures expressions for a node under state evaluation. Step 802 is followed by step 803, in which the redundant controller determines whether the node has another state to evaluate. If the node does not have another state to evaluate, the "No" branch is followed from step 803 to the end step 804. If the node does have another state to evaluate, the "Yes" branch is followed from step 803 to step 805, in which the redundant controller determines whether the state rule tree evaluates to "true." If the state rule tree evaluates to "true," the "Yes" branch is followed from step 805 back to step 803, in which the redundant controller determines whether the node has another state to evaluate. If the state rule tree does not evaluate to "true," the "No" branch is followed to step 806, in which the redundant controller determines whether the state under evaluation is the same as the current state of the node. If the state under evaluation is not the same as the current state of the node, the "No" branch is followed from step 806 back to step 803, in which the redundant controller determines whether the node has another state to evaluate.

If the state under evaluation is the same as the current state of the node, the "Yes" branch is followed from step 806 to step 807, in which the redundant controller updated the current service state. Step 807 is followed by step 808, in which the redundant controller evaluates and assigns variables for the state under evaluation. Step 808 is followed by step 809, in which the redundant controller executes state actions (invokes outputs). Step 809 is followed by the end step 803.

FIG. 7 demonstrates an illustrative embodiment of the controller loop. The controller samples sensors based on configured monitors in the controller configuration, performs service state evaluation based on obtained sensor readings, and resumes the loop after making sure that the current iteration has taken the time period configured for the loop. Service state evaluation logic of the preferred embodiment is presented on FIG. 8 for each configured service controller evaluates declarative measures. Measures are defined as formulas that can compute values based on sensor readings and variable values saved from previously completed controller loops. Following measure evaluation, a set of declarative rules is evaluated for each service, thus determining which state the service should be in for the current loop. Based on selected state any configured variable assignments are performed and outputs are activated. Output activation may be a relay, an indication or warning or alert light, an audible siren, a motor or solenoid actuation, etc.

Full controller redundancy configuration involves deploying dual hardware controllers wired to read sensor inputs in parallel and being able to activate output devices independently of each other. Refer to FIG. 2 for logical diagram of this controller deployment configuration. For reliability purposes each controller can be powered using separate power source and connected to a different network switch, access point or router to facilitate failover in case of network equipment failure.

Software operating on controllers is coordinated between the controllers to perform loop in a synchronized fashion. One of the controllers is elected or designated as a master controller in control of the outputs. The backup controller performs the same loop cycle as the master controller and calculates its outputs but does not apply them to the physical outputs, instead keeping calculated states and actions in memory. With each loop cycle the backup controller validates that the master controller is functioning. Master controller operation can be monitored either using network, bus, electrical or optical connection between controllers, or it can be implemented by monitoring master controller outputs and comparing them to the results of backup controller's loop calculations. Should this validation fail the backup controller initiates failover procedure in which it takes over the role of the master and outputs its calculation and rule evaluation results to the outputs, and signals to the other controller that it has been demoted to the role of a backup. If master controller is operational when it receives signal from the backup controller that it is being demoted, it relinquishes control of the outputs and assumes the role of a backup controller. This facilitates uninterrupted control over outputs even in case of a failure of a single controller device. Additionally read sensor state and computed state can be shared between controllers in each loop to aid in validating sensor input and controller operation. This sharing can be achieved using a network or bus connection between controllers. In order to avoid rapid oscillation of control state between redundant controllers a configurable hold down time is implemented which forces backup controller to stay in continuously healthy backup operational mode for minimum time period before it becomes eligible for requesting failover of master role.

Additionally this deployment configuration facilitates maintenance procedure in which backup controller is serviced and/or upgraded first, then when it comes online after maintenance a planned failover is performed in which the already maintained controller takes over the role of the master, then maintenance is performed of the original master controller thus facilitating in-service non-stop maintenance capability. Refer to FIG. 6 for flow diagram of non-stop maintenance process.

In another embodiment involving redundant compute modules, dual compute engines are embedded into a single controller device, each compute engine running a separate copy of the software and one of the compute engines elected as a master. Refer to FIG. 3 for logical diagram of this controller deployment configuration. Both compute engines are wired to read sensor inputs and activate controller outputs. The controller may or may not support hot replacement of compute modules. Compute modules are provided with a path to communicate with each other and signal to each the master status. Connectivity to networks may be facilitated via separate physical network links to facilitate failover in case of failure of a network switch, access point or router.

During normal operation both compute engines read sensor inputs and compute calculated state and logic rules, however only master compute engine controls the controller outputs. Backup compute engine monitors operation of the master compute engine and takes over the role of the master should it detect malfunction of the master compute engine, and starts to control controller device outputs based on the computed state and logic rules.

There can be situations where inputs are connected indirectly via a shared bus which prevents two compute engines from reading the same sensors concurrently. In this case backup compute module can read sensors readings read by the master compute engine and execute its logic based on those readings. As the backup controller takes over the master role it would also take over management of the bus to assume ownership of sensor reading process.

Similarly to redundant controller architecture, the embodiment with dual compute engines facilitates non-stop in-service maintenance and software updates where backup compute engine is maintained and/or updated first, followed by planned failover of the master role to the maintained compute engine with subsequent maintenance and/or update of the other compute engine. Refer to FIG. 6 for flow diagram of non-stop maintenance process.

In yet another embodiment exhibiting certain benefits described above can be achieved on a single controller device featuring a single compute engine by virtualizing controller software environment. Refer to FIG. 4 for logical diagram of this controller deployment model. In this approach two virtual machines operate in parallel on a single compute module (processor) and share access to sensor inputs and controller outputs. Communication to the network is shared using a software network bridge or similar network configuration employed traditionally in networking virtualized computing environments.

Both virtual environments execute their loops in a synchronized fashion and read sensor inputs and execute state calculations as well as compute logic rules. Only the virtual environment designated as master controls controller outputs. Backup compute environment either reads sensor data in parallel with the primary compute environment, or where it is not possible due to exclusive sensor access model, obtains a copy of the sensor readings from the primary virtual environment. Backup compute environment monitors operation of the master virtual environment and takes over the role of the master should a fault be detected.

Non-stop in-service software updates can also be performed by updating the backup virtual environment, bringing it in service, activating planned failover procedure to transfer the role of the master to the newly updated virtual environment, and then performing updates of the other virtual environment. Refer to FIG. 6 for flow diagram of non-stop maintenance process.

Alternatively the system can operate with a single virtual environment, and have a temporary second virtual environment instantiated for the duration of the maintenance procedure, and upon completion of failover from master to newly upgraded virtual environment have the original virtual environment destroyed thus returning to a single virtual environment mode.

All of the embodiments facilitate non-stop operation of IoT controllers that monitor or facilitate continuously important processes, and facilitates in-service updates and maintenance.

The present disclosure is particularly well suited to implementation on portable computing devices, which may communicate with a server system providing access to a number of client systems over a network, or as a dedicated computing system. As such, embodiments of the disclosure may comprise adapting or reconfiguring presently existing equipment. Alternatively, original equipment may be provided embodying the disclosure.

All of the methods described in this disclosure may include storing results of one or more steps of the method embodiments in a non-transient storage medium. The results may include any of the results described in this disclosure and may be stored in any manner known in the art. The storage medium may include any storage medium described in this disclosure or any other suitable storage medium known in the art. After the results have been stored, the results can be accessed in the storage medium and used by any of the method or system embodiments described in this disclosure, formatted for display to a user, used by another software module, method, or system, etc. Furthermore, the results may be stored permanently, semi-permanently, temporarily, or for some period of time. For example, the storage medium may be random access memory (RAM), and the results may not necessarily persist indefinitely in the storage medium.

Those having skill in the art will appreciate that there are various vehicles by which processes and/or systems and/or other technologies described in this disclosure can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described in this disclosure may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that various implementations may employ any suitable type of hardware, software, and/or firmware.

Those skilled in the art will recognize that it is common within the art to describe devices and/or processes in the fashion set forth in this disclosure, and then use engineering practices to integrate such described devices and/or processes into data processing systems. That is, at least a portion of the devices and/or processes described can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. All of the technology described in this disclosure is suitable for implementation using commercially available computing devices, such as network servers operated by the situational awareness system and smartphones or personal computers operated by members and customers. These computing devices may be interconnected via the Internet, mobile telephone voice and data system, or other data suitable network.

This disclosure sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components may be combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "functionally connected" to each other to achieve the desired functionality. Specific examples of functional connection include but are not limited to physical connections and/or physically interacting components and/or wirelessly communicating and/or wirelessly interacting components and/or logically interacting and/or logically interacting components.

While particular aspects of the present subject matter have been shown and described in detail, it will be apparent to those skilled in the art that, based upon the teachings of this disclosure, changes and modifications may be made without departing from the subject matter described in this disclosure and its broader aspects and, therefore, the appended claims are to encompass within their scope all such changes and modifications as are within the true spirit and scope of the subject matter described in this disclosure. Although particular embodiments of this disclosure have been illustrated, it is apparent that various modifications and embodiments of the disclosure may be made by those skilled in the art without departing from the scope and spirit of the disclosure. Accordingly, the scope of the disclosure should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. The disclosure is defined by the following claims, which should be construed to encompass one or more structures or function of one or more of the illustrative embodiments described above, equivalents and obvious variations.

The invention claimed is:

1. A redundant Internet-of-things control system, comprising:
   a plurality of Internet-of-things devices, each producing output data;
   a first controller providing network access communicating the output data over a network;
   a second controller providing network access communicating the output data over the network wherein the first controller and the second controller comprise processors;
   wherein the first and second controllers provide the network access through a synchronization loop in which the first and second controllers change roles as a master node and a backup node to provide the network access continuously while upgrading or evaluating service states of the first and second controllers;
   wherein the first controller performs the role of the master node periodically repeating the synchronization loop including querying sensors, reading sensor responses, applying logic rule, and outputting calculation and rule evaluation results;
   wherein the second controller performs the role of the backup node repeating the same synchronization loop as the first controller without outputting its calculation and rule evaluation results, validates the calculation and rule evaluation results of the first controller, and if the second controller determines that the first controller has failed, initiates a failover procedure in which the second controller takes over the role of the master node, outputs its calculation and rule evaluation results, and sends a demotion signal to the first controller indicating that the first controller has been demoted to the role of the backup node; and
   if the first controller is operational when it receives demotion signal from the second controller, the first controller relinquishes control of the outputs and assumes the role of the backup node.

2. The redundant Internet-of-things control system of claim 1, wherein the first and second controllers each comprise a plurality of services, wherein each service comprises a plurality of service states and associated state rules, actions, measures and variables.

3. The redundant Internet-of-things control system of claim 1, wherein the first and second controllers provide the network access continuously while conducting service state evaluations for the first and second controllers.

4. The redundant Internet-of-things control system of claim 1, wherein the first and second controllers provide the network access continuously while updating service states for the first and second controllers.

5. The redundant Internet-of-things control system of claim 1, where the first and second controllers comprise physically distinct controllers.

6. The redundant Internet-of-things control system of claim 1, where the first and second controllers comprise physically distinct processors within a common controller.

7. The redundant Internet-of-things control system of claim 1, where the first and second controllers comprise separate virtual machine software instances running on a common processor.

8. The redundant Internet-of-things control system of claim 1, where the Internet-of-things devices comprise sensors.

9. The redundant Internet-of-things control system of claim 1, where the Internet-of-things devices comprise output devices.

10. A method for controlling Internet-of-things devices comprising a synchronization loop in which a first controller and a second controller change roles as a master node and a backup node to provide a network access continuously while upgrading or evaluating service states of the first controller and the second controller; wherein the first controller and the second controller comprising processors;

wherein the first controller performs the role of the master node periodically repeating the synchronization loop including querying sensors, reading sensor responses, applying logic rule, and outputting calculation and rule evaluation results;

wherein the second controller performs the role of the backup node repeating the same synchronization loop as the first controller without outputting its calculation and rule evaluation results, validates the calculation and rule evaluation results of the first controller, and if the second controller determines that the first controller has failed, initiates a failover procedure in which the second controller takes over the role of the master node, outputs its calculation and rule evaluation results, and sends a demotion signal to the first controller indicating that the first controller has been demoted to the role of the backup node; and if the first controller is operational when it receives demotion signal from the second controller, the first controller relinquishes control of the outputs and assumes the role of the backup node.

11. The method of claim 10, further comprising configuring each of the first and second controller with a plurality of services, wherein each service comprises a plurality of service states and associated state rules, actions, measures and variables.

12. The method of claim 10, further comprising providing the network access continuously while conducting service state evaluations for the first and second controllers.

13. The method of claim 10, further comprising providing the network access continuously while updating service states for the first and second controllers.

14. The method of claim 10, further comprising configuring the first and second controllers as physically distinct controllers.

15. The method of claim 10, further comprising configuring the first and second controllers as physically distinct processors within a common controller.

16. The method of claim 10, further comprising configuring the first and second controllers separate virtual machine software instances running on a common processor.

17. The method of claim 10, further comprising configuring the Internet-of-things devices as sensors.

18. The method of claim 10, further comprising configuring the Internet-of-things devices as sensors output devices.

* * * * *